US005780086A

United States Patent [19]
Kirksey et al.

[11] Patent Number: 5,780,086
[45] Date of Patent: *Jul. 14, 1998

[54] COLOR AND SHELF STABLE BEVERAGE COMPOSITIONS CONTAINING TEA EXTRACT

[75] Inventors: Sanford Theodore Kirksey; Athula Ekanayake; Edmund Paul Pultinas, Jr., all of Cincinnati; Judith Ann Jones, Cleves; Richard Fiske Stradling, Jr., Cincinnati, all of Ohio

[73] Assignee: The Procter & Gamble Company, Cincinnati, Ohio

[*] Notice: The portion of the term of this patent subsequent to Aug. 8, 2014, has been disclaimed.

[21] Appl. No.: 582,593

[22] Filed: Jan. 3, 1996

Related U.S. Application Data

[63] Continuation of Ser. No. 287,334, Aug. 8, 1994, abandoned.

[51] Int. Cl.$^6$ .................. A23F 3/16; A23F 3/18; A23F 3/30
[52] U.S. Cl. .................. 010396/330.3; 426/546; 426/597
[58] Field of Search .................. 426/597, 330.3, 426/546

[56] References Cited

U.S. PATENT DOCUMENTS

| | | | |
|---|---|---|---|
| 2,891,865 | 6/1959 | Seltzer et al. | 99/77 |
| 2,902,368 | 9/1959 | Seltzer et al. | 99/77 |
| 2,927,860 | 3/1960 | Seltzer et al. | 99/77 |
| 3,113,028 | 12/1963 | Cooper et al. | 99/77 |
| 3,598,608 | 8/1971 | Ganiaris | 99/77 |
| 3,911,145 | 10/1975 | Marion | 426/597 |
| 3,950,553 | 4/1976 | Gasser et al. | 426/262 |
| 4,004,038 | 1/1977 | Wickremasinghe | 426/422 |
| 4,051,267 | 9/1977 | Jongeling | 426/330.3 |
| 4,135,001 | 1/1979 | Edmonds et al. | 426/250 |
| 4,156,024 | 5/1979 | Husaini | 426/257 |
| 4,440,796 | 4/1984 | Lunder et al. | 426/597 |
| 4,472,441 | 9/1984 | Clark | 426/387 |
| 4,539,216 | 9/1985 | Tse | 426/597 |
| 4,680,193 | 7/1987 | Lunder et al. | 426/597 |
| 4,717,579 | 1/1988 | Vietti et al. | 426/597 |
| 4,748,033 | 5/1988 | Syfert et al. | 426/330.3 |
| 4,851,252 | 7/1989 | Greither et al. | 426/599 |
| 4,906,480 | 3/1990 | Kashket | 426/3 |
| 4,935,256 | 6/1990 | Tsai | 426/330.3 |
| 4,946,701 | 8/1990 | Tsai et al. | 426/597 |
| 5,198,259 | 3/1993 | Hoogstad | 426/435 |
| 5,427,806 | 6/1995 | Ekanayake et al. | 426/597 |

FOREIGN PATENT DOCUMENTS

| | | | |
|---|---|---|---|
| 0 464 919 A1 | 1/1992 | European Pat. Off. | A23F 3/16 |
| 5-236876 | 9/1993 | Japan | A23F 3/22 |
| 5-236877 | 9/1993 | Japan | A23F 3/22 |
| 1789186 | 1/1993 | U.S.S.R. | A23L 2/00 |
| 1207326 | 9/1970 | United Kingdom | A23F 3/02 |
| 1469603 | 4/1977 | United Kingdom | A23F 3/00 |

OTHER PUBLICATIONS

Esselen, Jr. et al., "d–Isoascorbic Acid as an Antioxidant", Industrial and Engineering Chemistry, vol. 37, No. 3, (Mar., 1945), pp. 295–299.

Bauernfeind et al., "Food Processing with Added Ascorbic Acid, XVI. L–Ascorbic Acid vs. Erythorbic Acid", Advances in Food Research, vol. 18, Academic Press, NY (1970), pp. 220–236, 297–304.

Moore, Edwin Lewis, "An Investigation of the Factors Involved in the Deterioration of Glass–Packed Orange Juice", Thesis submitted for degree of Doctor of Philosophy, (May, 1942), pp. 6–30.

Katayama et al., "The Effects of Adding D–Iso–Ascorbic Acid to Fruit Juice",Kanzume Jiho, vol. 42, No. 10 (1963), pp. 1–15.

Borenstein, B., "The Comparative Properties of Ascorbic Acid and Erythorbic Acid", Food Technology, Nov., 1965, pp. 115–117.

Frank, J. N.; "Everybody Wins with Iced Tea"; Beverage Industry; vol. 11; 1993; pp. 8–10.

Pintauro, N. D.; "Tea and Soluble Tea Products Manufacture"; Food Technology Review; Noyes Data Corp.; No. 38; 1977; pp. 82–85.

*Primary Examiner*—Arthur L. Corbin
*Attorney, Agent, or Firm*—Karen F. Clark; Gerry S. Gressel

[57] ABSTRACT

The present invention relates to color and shelf stable beverage compositions comprising:

a) from about 0.4% to about 1.5% tea extract wherein the level of caffeine is from about 0.85% to about 3.2%; and the tea solids content is from about 12% to about 60%;

b) from about 10 ppm to about 40 ppm colorant;

c) from about 300 ppm to about 1500 ppm erythorbic acid or ascorbic acid;

d) from about 0.5% to about 8.0% citric acid;

e) an effective amount of sweetener; and f) water; and wherein the tea extract contains unoxidized flavanols.

29 Claims, No Drawings

COLOR AND SHELF STABLE BEVERAGE COMPOSITIONS CONTAINING TEA EXTRACT

This is a continuation of application Ser. No. 08/287,334, filed on Aug. 8, 1994, now abandoned.

FIELD OF INVENTION

The present invention relates to shelf stable beverages containing tea extract, colorant and/or juice. The beverages have the characteristics of the added color and resist browning and precipitation common in tea containing beverages.

BACKGROUND

Recent increases in sales and consumption of tea beverages have substantially increased the number of entrants of ready-to-drink tea containing products into the market. At the present time, many tea containing beverages are sold in the form of bottled, canned or carton-boxed products. Many of the beverages contain black tea extract with fruit juice, fruit aroma or fruit flavors, while others contain only tea flavors. Few products contain green tea extract due to the instability of the unoxidized flavanols and their astringent flavor. Yet green tea is believed to have therapeutic benefits.

In commercially available beverages, such as Snapple (Sunset Foods) and Fruit Tea Twister (Tropicana) the tea flavor (i.e. green grassy, woody notes) and astringency often overpower the fruit flavor. Another apparent disadvantage is the appearance. The product color is typically limited to the color of the tea extract (i.e. brown, muddy). Still another disadvantage is that the published health benefits of the unoxidized flavanols (green tea solids) are not realized by the consumer because black tea which contain polymerized flavanols or tea flavors are typically used in these beverages.

Many commercial beverages avoid degradation reactions by using black tea (which contain small quantities of unoxidized flavanols) or by omitting tea solids altogether. Tea essence or tea aromatics are substituted for tea solids. Only low levels of unoxidized flavanols are present therefore degradation reactions are limited. Beverages prepared using green tea have a grassy flavor and a characteristic green color (see Japanese Patent 5,236887). However, these beverages continue to degrade (i.e. brown, form precipitates or cloud) with time. Beverages made with the isolated unoxidized flavanols, see for example U.S. Pat. No. 4,946,701 to Tsai issued Aug. 7, 1990, undergo oxidation which results in precipitation, clouding and further color changes.

Attempts have been made to prevent and/or retard oxidation, precipitation and color changes by modifying the tea extraction process, see for example U.S. Pat No. 4,135,001 to Edmonds et al issued Jan. 16, 1979 and U.S. Pat. No. 4,539,216 to Tse, issued Sep. 3, 1985. Other attempts to avoid the instability of these products include completely removing water thus forming a dry powder, see for example U.S. Pat. No. 4,851,252 to Greither et al. issued Jul. 25, 1989, or adding antioxidants to the extract itself, see for example, Japanese Patent 57/194,749 to Kato. Antioxidants are used to prevent or retard oxidative decomposition. However, large amounts of antioxidants are added and pH regulating materials are needed to maintain the pH above 3.5 and to avoid beverage discoloration.

Beverages containing tea solids and in particular, unoxidized flavanols, and fruit juice and/or colorant present a special problem because of the natural amino acids, colorants, sugar and enzymes which may be present in the beverage. Unoxidized flavanols and colors are sensitive to degradation and must be used with acceptable antioxidants. Antioxidant(s) after an extended period of time lose their effectiveness and can degrade into other compounds. Even if preservatives are present, tea beverages can become brown and turbid because the components interact in degradation reactions to form precipitates. Therefore, the level and type of antioxidant must be chosen carefully. Large amounts of antioxidants can cause fading of colorants as well as produce precursors for the browning reaction.

Discoloration and precipitation of tea containing beverages are not eye appealing and are associated by some consumers with distasteful and old products. The color, flavor and stability of the beverage that contains tea, colorant and/or juice is largely dependent on the color and stability of the tea extract. It is known that color stability and flavor of the extract used to prepare the beverages is influenced by the degree of fermentation of the tea leaf and the processing steps used to obtain the extract. It is further known that the muddy or brown color development and precipitation is largely due to the oxidation of flavanols.

The manufacture of ready-to-serve beverages containing tea, colorant and/or juice is known. During the past couple of years a trend among the consumers has been developed in the direction of a preference for flavored tea beverages having a more juice-like and less tea-like appearance, and a correspondingly less astringent tea taste. Therefore, there is a need for a more stable product containing unfermented or partially fermented tea that has a more juice-like appearance and juice-like taste.

Accordingly, it is an object of this invention to provide shelf stable beverage compositions and a method for preparing stable beverages containing unfermented and partially fermented tea, colorants and/or juice.

Another object of this invention is to provide beverages containing tea, which have the beneficial effects associated with green tea without the known disadvantages of browning typically seen in tea products, precipitation or loss of unoxidized flavanols and color fading.

These and other objects will become apparent from the description herein.

All percentages are by weight unless otherwise indicated.

SUMMARY OF THE INVENTION

The present invention relates to color stable beverage compositions comprising:
 a) from about 0.4% to about 1.5% tea extract wherein the level of caffeine is from about 0.85% to about 3.2%; and the tea solids content is from about 12% to about 60%;
 b) from about 10 ppm to about 45 ppm colorant;
 c) from about 300 ppm to about 1500 ppm erythorbic acid or ascorbic acid;
 d) from about 0.1% to about 1% citric acid;
 e) an effective amount of sweetener; and
 f) water;
 wherein said tea extract has a Hunter L color value of from about 58 to about 63.5.

The present invention further relates to a method of preparing such beverages.

DETAILED DISCUSSION OF THE INVENTION

A. Definitions

As used herein, the term "comprising" means various components can be conjointly employed in the beverages of this invention. Accordingly, the terms "consisting essentially of" and "consisting of" are embodied in the term comprising.

As used herein the term "fruit flavors" refers to those flavors derived from the edible reproductive part of the seed plant, especially one having a sweet pulp associated with the seed, for example, apples, oranges, lemon, limes, etc. Also included within the term fruit flavor are synthetically prepared flavors made to simulate fruit flavors derived from natural sources. These fruit flavors can be derived from natural sources such as fruit juices and flavor oils or synthetically prepared. If desired, fruit juices, including orange, pineapple, lemon, lime, apple and grape can be used as a flavor component.

As used herein, the term "botanical flavor" or "botanical extract" refers to flavors derived from parts of the plant other than the fruit. As such, botanical flavors can include those flavors derived from nuts, bark, roots and leaves. Also included within this term are synthetically prepared flavors made to simulate botanical flavors derived from natural sources. Examples of botanical flavors include hibiscus, marigold, chrysanthemum and the like. These botanical flavors can be derived from natural sources such as essential oils and extracts or be synthetically prepared.

As used herein "single strength" refers to recommended drink strength, i.e. the ready-to-serve concentration of beverage compounds.

As used herein, the term "juice" means whole, concentrated or diluted juice from fruits and vegetables and other produce which are squeezed or crushed to supply a beverage. Juice also refers to citrus and non-citrus juices including some vegetable juices.

As used herein, the term "Vitamin C" refers to L-ascorbic acid. The term "erythorbic acid" refer to its isomer, D-isoascorbic acid.

As used herein, the term "nutritionally-supplemental amount" is meant that the mineral and vitamin sources used in the practice of this invention provide a nourishing amount of minerals and vitamins. This is supplemental or in addition to the amount found in the average diet. This supplemental amount will provide from about 25% to about 150% of the Recommended Dietary Allowance (RDA). The RDA for vitamins and minerals is as defined in the United States of America (see Recommended Daily Dietary Allowance-Food and Nutrition Board, National Academy of Sciences-National Research Council).

As used herein the term "shelf stable" refers to packaged beverages that do not require refrigeration while stored at ambient temperatures for prolonged periods (e.g. more than 10 days).

As used herein, the term "tea materials" includes materials obtained from the genus Camellia including *Camellia sinensis* and *Camellia assaimica*, for instance, freshly gathered tea leaves, fresh green tea leaves that are dried immediately after gather, fresh green tea leaves that have been heat treated before drying to inactivate any enzymes present, unfermented tea, instant green tea, partially fermented tea leaves are suitable for use. Tea leaves, tea plant stems and other plant material which are related and which have not undergone substantial fermentation to create black teas can also be used. Members of the genus Phylanthus, *Catechu gambir* or Unicaria family of tea plants can also be used.

As used herein, the term "solids" refers to the solid materials extracted from the tea solutions which are soluble in water. The solids include caffeine, flavanols, amino acids (especially theanine), edible acids, buffering salts, proteins and related materials.

As used herein "flavanols" means primarily catechin, epicatechin, and their derivatives. These derivatives include the sugar salts, sugar esters, and other edible physiologically available derivatives. Green tea solids contain these flavanols. The preferred flavanols are catechin, epicatechin, gallocatechin, epigallocatechin, epicatechin gallate, and epigallocatechin gallate.

As used herein "tea extract" refers to the product obtained by extraction of unfermented or partially fermented tea solids or tea material. This extraction can be carried out with water or solvents, and the resulting extract can be concentrated, for example, in liquid or paste form or dried, for example, in powder form. The term "tea extract" also refers to aqueous solutions produced from the liquid, paste or dried composition, prepared in such a way as to substantially reproduce the brew (tea).

As used herein the terms "brown" or "browning" refers to the color produced by typical tea containing beverages caused by oxidation of flavanols. The brown color is detectable by the human eye.

As used herein the term "color stability" means the beverage has a reduced tendency to change color during its normal shelf life.

BEVERAGE COMPONENTS

The tea-containing beverages produced in accordance with this invention are shelf stable, maintain the characteristic of the added colorant, and do not turn brown or turbid when stored for at least 6 months at room temperature. The tea extract is mixed with colorant, acids, sweetener, flavoring and other optional ingredients using standard beverage formulation techniques. Although carbonated beverages are within the scope of the present invention, particular emphasis is given to the making of non-carbonated beverages. It should be understood, however, that non-carbonated techniques, when appropriately modified, are also applicable to carbonated beverages. Also, while the following description is with reference to sugar containing beverages, diet beverages containing non-caloric and artificial sweeteners can also be prepared by appropriate modification. Beverages can include dry beverage mixes which are made by mixing flavors, sweeteners, and thickeners, emulsifiers and any additional ingredients.

The beverages of the present invention comprise tea extract, acids, colorants, and/or juice. It has been found that the appearance of the beverage can be stabilized and enhanced if ascorbic acid, erythorbic acid and citric acid are present in specified amounts either during the tea extraction process or in the beverage formula. Surprisingly, it has also been found that browning can be prevented if erythorbic acid, citric acid and ascorbic acid are added to the non-tea matrix of the beverage and to the extracting solution of the tea material. As used herein, the term "non-tea matrix" is meant the ingredients which are combined with the tea extract to form a beverage (i.e. flavor component, water, sweetener and colorant). The beverages show delayed browning or display no browning at ambient temperatures and above, even when stored in oxygen permeable containers such as PET (polyethylene terephthalate) and the like.

All concentration limits of components provided herein are based on single strength beverages. The present invention also includes beverage concentrates, from which single strength beverages can be produced by the addition of water. Therefore, concentration limits for beverage concentrates are a simple multiple of the limits provided below, depending on the dilution factor used to make a single strength beverage from concentrate. Thus, for a 4X concentrate (diluted 3:1 by water to give a single strength beverage), the component concentration limits are four times those stated below, and for a 6X concentrate (diluted 5:1 by water to give a single strength beverage), the component concentration limits are five times those stated below.

Tea Extract

The tea extracts of the present invention contain unoxidized flavanols. These flavanols exhibit a strong tendency to cloud and produce sediment on storage. The sediment consists mainly of complexes of flavanols and caffeine. Flavanols impart the typical astringent character and the color to the tea extract. It is known that the color of a tea extract is provided by the oxidation of the flavanols into theaflavins and thearubigins. Aqueous tea extracts have a color ranging from gray to golden to brown to rosy pink in hue. It is also known that less astringent flavor is largely related to high theanine content. Both color and flavor of tea are influenced by the processing steps. Because of the variability of the starting tea extract and the nature of the processing, the control of tea color and flavor is an essential part of the present invention.

The extract can be obtained from tea materials or other natural sources. The tea extract may be obtained from either a single plant or mixtures of plants.

It is important that the tea extract be light in color and preferably, the extract is deflavored. Suitable means for deflavoring the extract can be found for example, in U.S. Pat No. 4,935,256 to Tsai issued Jun. 19, 1990 and U.S. '628 published Jan. 7, 1997.

In order to realize the full benefit of the present invention (prevent browning) the extract is obtained by contacting green tea materials with a solution containing citric acid and erythorbic or ascorbic acids. The solution is then subsequently gelatin treated, clarified and concentrated. When the acids are used in combination with low temperatures, gelatin treatment, and concentration via evaporation, an extract having very suitable properties for incorporating into non-tea matrixes is produced. Surprisingly the addition of citric acid with antioxidants such as erythorbic acid or ascorbic acid reduces the viscosity and improves the clarity of the tea extract and subsequently the tea containing beverage. An additional outcome is that the combination of citric acid and erythorbic acid and/or ascorbic acid reduces the oxidation of the flavanols. They can also have 0.85% to 3.2% caffeine.

The extracts used in the beverage comprise from about 12% to about 60% tea solids from about 3% to about 10%, preferably from about 5% to about 8% and more preferably from about 4% to about 7% erythorbic and/or ascorbic acid; from about 1% to about 6%, preferably from about 2% to about 5%, and most preferably from about 2.5% to about 3.3% citric acid; and from about 2% to about 6%, preferably from about 2.5% to about 5%, and most preferably from about 3% to about 4% flavanols. They can have 0.85% to about 3.2% caffeine.

The Hunter color scale system can be used to help define the color of the tea beverages described herein. The Hunter system is described by R. S. Hunter, "*Photoelectric Color Difference Meter,*" *Journal of the Optical Society of America* 48, 985–995 (1958), and U.S. Pat. No. 3,003,388 to Hunter et al., issued Oct. 10, 1961. The L value is used to read the light to dark scale. Water has an L value of 64. The Hunter L value for from about 0.4% to about 1.2% of the extract in water is from about 58 to about 63.5, preferably from about 59 to about 63.5, and more preferably from about 61 to about 63.

The beverages of the present invention comprise from about 0.4 to about 1.5% and preferably from about 0.6% to about 1.2% tea extract.

Any tea extract obtained from unfermented or partially fermented tea may be used in the beverages of the present invention. However, it has been found that beverages containing extracts prepared by other processes delay browning rather than prevent browning.

Erythorbic, Ascorbic Acid and Citric Acid

The essential components which help to delay/prevent browning in the tea containing beverages of the present invention are erythorbic acid or ascorbic acid and citric acid. The acids used as additives in the present invention may be applied as a liquid at any stage during the manufacture of the beverages or may be added in dry form to the beverage or water used for extracting the tea material. However, there are specific points during the manufacture of the beverages where the addition is most convenient or where the best conditions for maximum control of the browning exist. For example if the acids are present during the tea extraction process and are added to the non-tea matrix of the beverage as part of the tea extract, browning is prevented. If the acids are not used during the extraction process of the tea material and are only added to the non-tea matrix of the beverages, browning of the tea containing beverages will only be delayed. If the tea extract is prepared by the process described herein, the browning is prevented for at least 2 months at room temperature.

Erythorbic or ascorbic acid is present in the beverage products of the present invention in an amount of from about 300 ppm to about 1500 ppm. Preferably the beverage products contain from about 300 to about 900 ppm, more preferably from about 400 ppm to about 800 ppm, and most preferably from about 500 ppm to about 750 ppm erythorbic and from about 400 ppm to about 1,200 ppm ascorbic acid. Addition of ascorbic acid also plays a role as a fortification of Vitamin C. Preferably the beverage products of the present invention have at least 400 ppm of ascorbic acid. The total level of erythorbic and ascorbic acid preferably does not exceed 1500 ppm of the beverage composition.

Beverage compositions of the present invention preferably provide a person with at least 20% of the U.S. RDA of Vitamin C, preferably from about 25% to about 100% of the U.S. RDA of Vitamin C. However, up to about 220% U.S. RDA of Vitamin C can be added to the present invention to provide protection during processing and storage. The amount of added ascorbic acid is dependent on processing conditions and the amount of Vitamin C delivery desired after storage.

The other essential component is citric acid. While not wishing to be bound by theory, it is believed that the citric acid lowers the pH, thus reducing the contribution of Maillard type products which contribute to the development of brown color in the tea. More importantly it is believed that the citric acid complexes with metals such as iron and copper which are known as oxidation catalysts. When the combination of acids are added to the beverages of the present invention the oxidation rate of flavanols is substantially decreased.

The beverages products of the present invention comprise from about 0.1% to about 1%, preferably from about 0.1% to about 0.5% citric acid.

Color and Colorant

The color of the final beverage depends not only on the extract used, and the method used to obtain the extract but also on the colorants. As used herein "color" means the human eye's perception of colored materials, such as red, green, blue etc. The term "colorant" as used herein means any chemical compound that imparts color which include natural pigments, synthetic pigment, color additives and mixtures thereof.

The beverages of the present invention preferably comprise certain combinations of FD&C Blue Dye No. 1 (Brilliant Blue FCF, CI Food Blue 2, color index no. 42090), FD&C Red Dye No. 40 (allur red, EI food Red 17, color index no. 16035), FD&C Yellow Dye No. 5, FD&C Dye No. 6, and mixtures thereof. Natural pigments and color additives, for example the anthocyanins, flavanols, and carotenoids, beet powder, grape skin extract, tumeric, annatto and paprika may also be used however they are not preferred because of economical reasons.

pH

The pH of the tea extract and the resulting beverage composition influences the astringent character and the color of the final beverage. The preferred extract has a pH below 3.5. The preferred beverages, prepared according to the present invention have a pH value within the range of from about 2.5 to about 4.0. The preferred beverages have a pH value of from about 3.0 to about 3.8.

Flavor Component

The particular amount of the flavor component effective for imparting flavor characteristics to the beverage depends upon the flavor(s) selected, the flavor impression desired and the form of the flavor.

The flavoring system can comprise a fruit juice or vegetable juice, a fruit or vegetable flavor or mixtures thereof. In particular the combination of tea together with fruit juices have an appealing taste. The juice can be provided as juice made from apple, cranberry, pear, peach, plum, apricot, nectarine, grape, cherry, currant, raspberry, gooseberry, blackberry, blueberry, strawberry, lemon, lime, mandarin, orange, grapefruit, potato, tomato, lettuce, celery, spinach, cabbage, watercress, dandelion, rhubarb, carrot, beet, cucumber, pineapple, coconut, pomegranate, kiwi, mango, papaya, banana, watermelon, tangerine and cantaloupe. Preferred juices are apple, pear, lemon, lime, mandarin, grapefruit, cranberry, orange, strawberry, tangerine, grape, kiwi, pineapple, passion fruit, mango, guava, raspberry and cherry. Citrus juices, preferably grapefruit, orange, lemon, lime, mandarin and juices of mango, passion fruit and guava, or mixtures thereof are most preferred.

The fruit or vegetable juice(s) are present in an amount of from 0% to about 60%, preferably from about 3% to about 35%, and more preferably from about 5% to about 10% of the beverage. This concentration is based on the single strength of the beverage.

The flavoring system according to the present invention can also comprise flavors selected from fruit flavors, botanical flavors, vegetable flavors and mixtures thereof Particularly preferred fruit flavors are the citrus flavors including orange flavors, lemon flavors, lime flavors and grapefruit flavors. Besides citrus flavors, a variety of other fruit flavors can be used such as apple flavors, grape flavors, cherry flavors, pineapple flavors and the like. These fruit flavors can be derived from natural sources such as fruit juices and flavor oils, or else be synthetically prepared. Particularly preferred botanical flavors are hibiscus, marigold and chrysanthemum.

The flavor component can also comprise a blend of various flavors, e.g., lemon and lime flavors, citrus flavors and selected spices (the typical cola soft drink flavor) etc. If desired the flavor can be formed into emulsion droplets and then dispersed in the beverage drink. Because these droplets usually have a specific gravity less than that of water and would therefore form a separate phase, weighting agents (which can also act as clouding agents) can be used to keep the emulsion droplets dispersed in the beverage. Examples of such weighting agents are brominated vegetable oils (BVO) and resin esters, in particular the ester gums. See L. F. Green, Developments in Soft Drinks Technology. Vol. 1 (Applied Science Publishers Ltd. 1978) pp. 87–93 for a further description of the use of weighting and clouding agents in liquid beverages.

Flavor components which are not substantially juice, comprise no more than about 3% of the beverage, preferably such flavor component comprises at least 0.001% by weight of the beverage and typically from about 0.01% to about 3% by weight of the beverage; especially if the beverage is to be carbonated.

Citrus juice blends can also contain citrus pulp. From 0% to about 19% (v/v) pulp is acceptable. Preferably, the amount of pulp is from about 3% to about 12% (volume/volume), and the pulp particles are from about 0.50 mm. to about 5 mm. in size.

Sweetener Component

The beverage product of the present invention contains a sweetener in an amount sufficient to provide the desired flavor and textured. The beverage product will preferably comprise a carbohydrate sweetener.

The carbohydrate sweetener is preferably a mono- and or disaccharide sugar such as maltose, sucrose, glucose, fructose, invert sugars and mixtures thereof. Especially preferred is fructose. All of these sugars are typically incorporated into the beverage product as syrups, but they can likewise be incorporated while in other forms, e.g. solid form. These sugars are also provided to some extent by other added materials in the beverage product such as fruit juice, optional flavorants and so forth.

Fructose for use in the beverage product can be provided as liquid fructose, high fructose corn syrup, dry fructose or fructose syrup, but is preferably provided as high fructose corn syrup comprising at least about 50% by weight of fructose. Preferred fructose sources are high fructose corn syrups containing 55% fructose solids and liquid fructose (contains 99% fructose solids), both of which are available from A. E. Staley Manufacturing, Decatur, Ill.

Sugar alcohols can also be used in the beverages of the present invention. These sugar alcohols include sorbitol, mannitol, and xylitol. Usually, however, these materials are not used as the sole sweetener because at the levels required to sweeten beverages, they have a side effect of flatulence or related gastrointestinal related problems.

For diet beverages, non-caloric sweeteners can be used. Examples of such sweeteners include aspartame, saccharine, cyclamates, acetosulfam, L-aspartyl-L-phenylalanine lower alkyl ester sweeteners, L-aspartyl-D-alanine amides as disclosed in U.S. Pat. No. 4,411,925 to Brennan, et al (1983), L-aspartyl-D-serine amides disclosed in U.S. Pat. No. 4,399, 163 to Brennan et al (1983), L-aspartyl-hydroxymethylalkane amide sweeteners disclosed in U.S. Pat. No. 4,338,346 issued to Brand (1982), L-aspartyl-l-hydroxyethylalkane amide sweeteners disclosed in U.S. Pat. No. 4,423,029 to Rizzi (1983), glyccherins, synthetic alkoxy aromatics, etc. Lo Han Guo juice which contains a natural sweetener can also be used as a sweetener. When it is used the amount of sugar is usually about half.

The amount of sweetener effective in the beverages of the present invention depends upon the particular sweeteners used and the sweetness intensity desired. For non-caloric sweeteners this amount varies depending upon the sweetness intensity of the particular sweetener. The amount for artificial sweeteners generally ranges from about 0.01% to about 0.1%.

Another way of measuring the amount of sweetener is to base it upon the sweetness compared to sucrose. For carbohydrates or sugars, the amount of sweetener can be from about 1% to about 14%, and preferably from 6% to about 14% by weight for single strength beverages. Preferred beverages contain from 9% to about 13% by weight sugar.

Mixtures of low calorie or artificial sweeteners sugars can also be used in the present invention, i.e., a mixture of aspartame and sucrose or high fructose corn syrup can be used. This provides a reduced calorie beverage.

Water

Beverages according to the present invention typically contain from about 80% to about 85% water. Preferably the water is demineralized. Concentrates of the present invention typically contain from about 25% to about 75%, preferably from about 40% to about 60% water. If desired the water may be carbonated. Usually a beverage will be considered to be carbonated if it comprises more than 30%, preferably more than 100% by volume of the beverage of solubilized carbon dioxide. Carbonated beverages comprise typically from 100% to 450%, preferably from 200% to 350% carbon dioxide by volume of the beverage. Carbonated beverages usually contain very low levels or no pulp.

The carbonated beverage can then be placed in a container such as a HDPE bottle or other suitable container and sealed. See L. F. Green, Developments in Soft Drinks Technology, Vol. 1 (Applied Science Publishers Ltd. 1978), pp. 102–107, for a further description of beverage making, in particular the process for carbonation.

Stability

The stability of the beverage products must meet particular requirements in order to be shelf stable. These products are sometimes stored in oxygen permeable containers and are often exposed to elevated temperatures and light which are extremely damaging to the sensitive flavanols. The beverages must exhibit both microbial stability as well as stability from browning and flavanol precipitation. The beverages of the present invention are stable from microbial growth, discoloration and flavanol precipitation for at least about 2 months at 70° C.

OTHER INGREDIENTS

Caffeine is typically a component of the tea extract but can be added separately. The caffeine present in any ingredient should be factored into the percentage of caffeine in the beverage. Purified caffeine obtained from the extraction of coffee or synthetically produced caffeine can also be used. The amount of caffeine is from about 0.002% to about 0.05%, preferably from about 0.005% to about 0.02%, and most preferably about 0.013% by weight of the single strength beverage.

Other minor ingredients can be included in the beverages of the present invention. Such ingredients include benzoic acid, sorbic acid and salts thereof salt (e.g. sodium chloride) and other flavor enhancers. Gums, emulsifiers and oil can also be included in the beverage for texture and opacity purposes. Typical ingredients include guar gum, pulp, xanthan gum, alginates, mono- and di-glycerides, lecithin, starches pectin, cotton seed oil and vegetable oil.

Nutritional Supplementation

The beverage composition can additionally comprise from 0% to about 150% of the U.S. RDA of vitamins and minerals such that the vitamins and minerals are chemically and physically compatible with the essential elements of the beverage compositions. Preferably Vitamins A, C, and E are added. The anti-oxidant vitamins and other vitamin precursors such as beta-carotene can also be added.

BEVERAGE PREPARATION

Method for Making Tea Extract

The first step of the process for making the tea extract comprises contacting the tea materials with water containing erythorbic or ascorbic acid and citric acid. Any type of unfermented or partially fermented tea materials can be used in the present invention. Examples of unfermented teas are fresh tea leaves, green tea, and instant green tea. An example of partially fermented tea is Oolong tea. The leaves may be whole or comminuted, for example, a powder. In selecting a tea material for making extracts, one must be careful not to select teas that are over-oxidized. If the tea material has been over-oxidized during curing, fermenting or otherwise, there will be a greater percentage of insoluble substances and less percentage of unoxidized flavanols present in the final tea extract.

The amount of acids to be added to any particular tea material will depend upon the inherent color and flavor properties of the starting material and the color and flavor properties desired. Because of wide variations in tea materials, it is not possible to fix definite limits on the amounts of acid addition.

The extraction may be carried out batchwise, semi-continuously, continuously or by equivalent procedures. The preferred methods are batchwise or semi-continuous.

A. Batch Method

In order to provide a tea extract that is light in color and will not become cloudy once incorporated into a beverage, the amount, ratio and type of acids used in the process as well as the order of addition is extremely important. Also, it is important to prevent oxidation. Any oxidation will detract from the desired color and flavor, and stability of the resulting extract.

In the batch method, tea material is extracted at a temperature of from about 40° C. to about 50° C. preferably at a temperature of from about 45° C. to about 50° C. with an aqueous solution containing ¾ to about ½ of the total amount of erythorbic acid, ascorbic acid or mixtures thereof and the total amount of citric acid used in the extraction process. The ratio of tea material to aqueous solution is from about 1:7 to about 1:20, preferably the tea material to aqueous solution is at a ratio of from about 1:7 to about 1:9 and more preferably, about 1:8. The ratio of erythorbic acid/ascorbic acid to tea material used in the process is from about 1:6 to about 1:10, preferably from about 1:7 to about 1:9 and most preferably about 1:8. The ratio of citric acid to tea material is from about 1:10 to about 1:34, preferably from about 1:20. These weights are based upon the weight of tea material and were found to be suitable to provide an appropriate modification of color and flavor, the actual amount used within these ranges will depend upon the characteristics of the initial starting material and the characteristics desired in the final product. The acids are weighed and dissolved in sufficient water to make an aqueous solution of the desired amount based on the weight of tea material. For example, if 10 grams of tea materials are used, 1.11 grams of erythorbic acid and 0.5 grams of citric acid are dissolved in 92 grams of water.

The extraction is carried out a period of time sufficient to produce an aqueous extract containing from about 0.75% to about 2.5% soluble solids, preferably from about 1% to about 2% soluble solids. The extract is separated from the tea materials and other solid tea residue, for example, by settling and decanting, filtration, or centrifugation.

Fresh water containing the remaining erythorbic/ascorbic acid is added to the tea material at a ratio of from about 1:7 to about 1:20, preferably from about 1:8 to about 1:15. The second extraction is carried out at temperature of from about 40° C. to about 48° C., preferably from a temperature of from about 43° C. to about 46° C. The extraction is carried out a period of time sufficient to produce an aqueous extract containing from about 0.5% to about 2.0% soluble solids, preferably from about 1.0 to about 1.5 soluble solids. After removing the tea material, the two extracts are pooled. The aqueous solution for the second extraction of the 10 grams of tea material exemplified above would contain 0.125 grams of erythorbic acid in 92 grams of water.

The volume of the combined extract is measured. The tea extract is then mixed with a 25% gelatin solution. The gelatin may be added as a powder however, it is not preferred. The amount of gelatin to be added to the extract is determined by the amount of tea solids present in the extract. The ratio of gelatin solution to tea solids suitable for clarifying the extract and reducing the astringent flavor is from about 1:2 to about 1:6, preferably from about 1:3 to about 1:5.

The extract which has been gelatin treated is cooled to a temperature of from about 10° C. to about 20° C., preferably from 10° C. to about 15° C. and centrifuged under a nitrogen blanket or other inert gas atmosphere. Care should be taken to reduce air entrainment and to maintain the temperature within this range.

After centrifuging the extract is evaporated at a temperature of from about 50° C. to about 80° C. to a solids content of from about 12% to about 60%, preferably from about 20% to about 50% solids.

B. Semi-Continuous Method

In preparing the tea extract, tea materials are extracted with an aqueous solution containing erythorbic acid, ascorbic acid or mixtures thereof and citric acid. The first step is adding from about ¾ to about ½ of the total amount of erythorbic acid, ascorbic acid or mixtures thereof to be used in the process and the total amount of citric acid to a tank containing water. Since the amount of acids to be added are based on the weight of tea material, the weight of tea material to be added is determined in advanced. The ratio of erythorbic and/or ascorbic acid to tea leaves is from about 1:6 to about 1:10, preferably from about 1:8; and the ratio of citric acid to tea material is from about 1:10 to about 1:34, preferably from about 1:20. The tea materials are then added to the aqueous solution containing the acids. The ratio of aqueous acid solution to tea material is from about 1:7 to about 1:20. The tea materials are completely wetted. The extraction is carried out at a temperature of from about 40° C. to about 50° C., preferably, at a temperature of from about 45° C. to about 50° C., until solution reaches a Brix greater than 4. From about 60% to about 80%, preferably from about 65% to about 75%, and, most preferably, 70% by weight of the solution (first portion) is pumped into a filter tank where additional water containing the remainder of the erythorbic acid, ascorbic acid or mixtures thereof are used to flush the filter. Water is added until the tea extract reaches a Brix of from about 1 to about 3, preferably from about 1.5 to about 2. It has been found that the ratios of erythorbic/ ascorbic acid and citric acid are critical to the process. When substantially lower levels of erythorbic/ascorbic acid are used the ability to inhibit browning is reduced while at substantially higher levels additional benefits are minimal. Higher levels of citric acid produce an extract with undesirable color (red) while lower levels reduce the clarity of the resulting extract. After removal of the first portion of tea extract, the remainder of the tea solution (second portion) is used to extract another quantity of tea, thereby increasing the solids level.

The first portion is pumped under vacuum to limit the oxygen content of the extract to a vacuum tank where it is treated with gelatin to help clarify the extract, reduce the color and remove some of the harsh, astringent flavor. The volume of extract is measured. The tea extract is mixed with a 25% gelatin solution. The gelatin may be added as a powder however, it is not preferred. The amount of gelatin solution to be added to the tank is determined by the amount of tea solids present in the extract. The ratio of gelatin to soluble solids suitable for clarifying the extract and reducing the astringent flavor is from about 1:2 to about 1:6, preferably from about 1:3 to about 1:5. Higher levels of gelatin produce a bland tea flavor and decrease the amount of unoxidized flavanols in the resulting extract, while lower levels of gelatin produce a strong flavor and increase the amount of oxidized flavanols in the resulting extract.

The extract which has been gelatin treated is cooled to a temperature of from about 10° C. to about 20° C., preferably 10° C. to about 15° C. and centrifuged under an inert atmosphere, e.g. a nitrogen blanket. Care should be taken to reduce air entrainment and to maintain the temperature within this range. Incorporation of air and/or change in temperature produces undesirable results (i.e. oxidized flavanols, agglomeration of gelatin, browning of product).

After centrifuging the extract is evaporated, preferably under reduced pressure, at a temperature of from about 50° C. to about 80° C. to a solids content of from about 12% to about 60%, preferably from about 20% to about 50% solids. Reduced pressure can be used in the evaporation process.

The resulting aqueous tea extract solution comprises from about 20% to about 60% solids, from about 3% to about 17%, preferably from about 5% to about 15% and more preferably from about 7% to about 11% erythorbic and ascorbic acid; from about 1% to about 6%, preferably from about 2% to about 5%, and most preferably from about 2.5% to about 3.3% citric acid; and from about 2% to about 6%, preferably from about 2.5% to about 5%, and most preferably from about 3% to about 4% flavanols and from about 0.85% to about 3.2% caffeine. The theanine to caffeine ratio is from about 1:17 to about 1:200, preferably from about 1:50 to about 1:100, and more preferably from about 1:30 to about 1:60. The presence of increased theanine levels and reduced levels of oxidized flavanols provides a less astringent and harsh tasting extract. The ratio of theanine to oxidized flavanols in the resulting extract is from about 1:20 to about 1:150, preferably from about 1:30 to about 1:100, and more preferably from about 1:50 to about 1:70.

Optionally the extract can be dried to produce reconstitutable tea extract solids. Conventional drying means, such as freeze drying, vacuum belt drying and spray drying can be used to provide a substantially water-free, shelf stable powder which can be reconstituted. A concentrated extract suitable for drying preferably has from about 25% to about 60% soluble solids, preferably from about 30% to about 60% and more preferably from about 40% to about 60% soluble solids.

During concentration and drying it is preferred that the temperature stay below about 70° C., more preferably not to exceed a temperature of about 50° C. This extract is preferred for making beverages of the type hereinafter described.

BEVERAGE PREPARATION

The tea-containing beverages produced in accordance with this invention are of acceptable flavor, color and aroma.

Colorants, tea extract, acid, sweetener, flavoring and other optional ingredients are mixed together. The beverage may also contain nutritionally- supplemental amounts of Vitamins A, C, E and their precursors, such as beta-carotene. Other vitamins such as D and B complex can also be added.

In making a single strength beverage, a beverage concentrate or beverage syrup is usually formed first. This beverage concentrate typically contains water soluble flavors, flavor oils, or fruit juice concentrates, acid, color and/or suitable preservatives if needed. The beverage concentrate usually contains from about 5% to about 70% by weight water. The ingredients are added to the water and mixed in conventional equipment. After the concentrate is formed, sugar and water are added to make a beverage syrup. This beverage syrup is then mixed with an appropriate quantity of water or carbonated water to form a finished beverage or finished beverage concentrate. The product is hot packed and stored in a suitable container.

TEA EXTRACT

The tea extract may be dilute, concentrated or dried. Beverages preferably contain from about 0.4% to about 1.5% tea extract. Preferably the extract is concentrated and comprises form about 12% to about 40% tea solids.

EXAMPLE I

Preparation of Extract 102.1 kilograms of erythorbic acid and 40.8 kilograms of citric acid are added to 7,571 liters of water in a stainless steel tank at about 46° C. 816 kilograms of green tea fannings are added to the erythorbic acid/citric acid mixture. The mixture is allowed to brew for about 75 minutes. The resulting slurry is pumped to a filter and an additional 8,706 liters of water are used to flush the tea extract from the filter. The extract is clarified at a temperature of from about 40° C. to about 46° C. and about 276 kilograms of a 25% aqueous solution of gelatin is added. The resulting mixture is coarse filtered through a U.S. Standard 100 mesh screen, chilled to a temperature of from about 10° C. to about 12° C., centrifuged at about 12 rpm under a nitrogen atmosphere and evaporated into a two phase evaporator to a solids level of about 55° Brix. The resulting green tea concentrate is cooled to about 21° C. and filled into a suitable container.

EXAMPLE 1

A fruit based, shelf stable beverage is prepared by mixing the following ingredients.

| Ingredient | Amount (% by weight) |
|---|---|
| high fructose corn syrup 42 (71% solids) | 18.50 |
| water | 79.28 |
| Gums | 0.045 |
| Food Starch | 0.114 |
| citric acid | 0.42 |
| fruit juice concentrates[1] and flavor oils | 1.00 |
| green tea concentrate prepared according to Example I[2] | 0.56 |
| ascorbic acid | .05 |
| Erythorbic Acid | .023 |
| vitamin E acetate | .006 |
| colorant[3] | .004 |
| vitamin A palmitate | .003 |

(1) The fruit juice concentrates are a mixture of apple, tangerine, lime and orange juice concentrates.

(2) The green tea concentrate contains about 40% solids, 2.7% caffeine., 10% erythorbic acid, and 5.23% citric acid.

(3) The colorant is a mixture of Yellow #5 and Yellow #6.

Example 2

| Ingredient | Amount (% by weight) |
|---|---|
| high fructose corn syrup (71% solids) | 17.8 |
| water | 80.16 |
| Gums | 0.045 |
| citric acid | 0.35 |
| fruit juice concentrates[1] and flavor oils | 1.00 |
| green tea concentrate[2] | 0.56 |
| ascorbic acid | 0.05 |
| Erythorbic Acid | 0.023 |
| vitamin E acetate | 0.006 |
| colorants[3] | .003 |
| vitamin A palmitate | 0.003 |

(1) The fruit juice concentrates are a mixture of apple, tangerine, lime and orange juice concentrates.

(2) The green tea concentrate contains about 40% solids, 2.5% caffeine., 10.0% 5 erythorbic acid, and 5.23% citric acid.

(3) The colorant is a mixture of Yellow #5 and Blue #1.

What is claimed is:

1. A color stable beverage composition comprising:

a) from about 0.4% to about 1.5% green tea extract having a tea solids content of from about 12% to about 60% and a Hunter L color value of from about 58 to about 63.5;

b) from about 10 ppm to about 45 ppm colorant;

c) a total level of erythorbic and ascorbic acid of from about 300 ppm to about 1500 ppm;

d) from about 0.1% to about 1.0% citric acid;

e) an effective amount of sweetener; and f) water;

wherein said green tea extract is obtained by extracting unfermented tea solids or tea material with an aqueous solution containing erythorbic acid, ascorbic acid or mixtures thereof and citric acid and wherein said green tea extract comprises from about 3% to about 10% erythorbic acid, ascorbic acid, or mixtures thereof; from about 1% to about 6% citric acid, from about 2% to about 6% flavanols; theanine; from about 0.85% to about 3.2% caffeine; and water; wherein the theanine to caffeine ratio is from about 1:17 to about 1:200; and wherein the extract has a ratio of theanine to oxidized flavanols of from about 1:20 to about 1:150.

2. A color stable beverage composition according to claim 1 wherein said colorant is selected from the group consisting of FD&C Blue Dye No. 1, FD&C Red Dye No. 40, FD&C Yellow Dye No. 5, FD&C Dye No. 6, and mixtures thereof.

3. A color stable beverage composition according to claim 2 further comprising an effective amount of flavorant.

4. A color stable beverage composition according to claim 3 wherein said flavorant is a fruit flavor.

5. A color stable beverage composition according to claim 4 wherein said sweetener is selected from the group consisting of mono- and/or disaccharides sugars and mixtures thereof.

6. A color stable beverage composition according to claim 5 wherein said sweetener comprises from about 1% to about 14% of said beverage.

7. A color stable beverage composition according to claim 4 wherein said beverage have a pH of between about 3.0 to about 3.8.

8. A color stable beverage composition according to claim 4 wherein said flavorant is fruit juice selected from group consisting of apple, pear, lemon, lime, mandarin, tangerine, grapefruit, cranberry, orange, strawberry, grape, kiwi, pineapple, passion fruit, mango, guava, raspberry and cherry, grapefruit, orange, lemon, lime, mandarin, mango, passion fruit, guava, and mixtures thereof.

9. A color stable beverage composition according to claim 8 wherein said citric acid comprises from 0.1 to about 0.5%.

10. A color stable beverage composition according to claim 3 wherein said sweetener comprises from about 0.01% to about 0.1% artificial sweetener.

11. A color stable beverage composition according to claim 10 wherein said sweetener is aspartame.

12. A color stable beverage composition according to claim 3 wherein said beverage has a pH between about 2.5 and about 4.0.

13. A color stable beverage composition according to claim 1 further comprising from about 0.013% to about 0.02% caffeine.

14. A color stable beverage composition according to claim 1 which is stable from discoloration and flavanol precipitation for at least 2 months at 70° C.

15. A shelf stable beverage composition comprising:
a) from about 0.4% to about 1.5% green tea extract having a tea solids content of from about 12% to about 40%;
b) from about 10 ppm to about 45 ppm colorant;
c) a total level of erythorbic and ascorbic acid of from about 300 ppm to about 1500 ppm;
d) from about 0.1% to about 1.0% citric acid;
e) an effective amount of sweetener; and
f) water;
wherein said green tea extract is obtained by extracting unfermented tea solids or tea material with an aqueous solution containing erythorbic acid, ascorbic acid or mixtures thereof and citric acid and wherein said green tea extract comprises from about 3% to about 10% erythorbic acid, ascorbic acid or mixtures thereof; from about 1% to about 6% citric acid; from about 2% to about 6% flavanols; theanine; from about 0.85% to about 3.2% caffeine; and water; and wherein the theanine to caffeine ratio is from about 1:17 to about 1:200; and wherein the extract has a ratio of theanine to oxidized flavanols of from about 1:20 to about 1:150.

16. A shelf stable beverage composition according to claim 15 wherein said colorant is selected from the group consisting of FD&C Blue Dye No. 1, FD&C Red Dye No. 40, FD&C Yellow Dye No. 5, FD&C Dye No. 6, and mixtures thereof.

17. A shelf stable beverage composition according to claim 16 further comprising an effective amount of flavorant.

18. A shelf stable beverage composition according to claim 17 wherein said flavorant is a fruit flavor.

19. A shelf stable beverage composition according to claim 18 wherein said sweetener is selected from the group consisting of mono- and/or disaccharides sugars and mixtures thereof.

20. A shelf stable beverage composition according to claim 19 wherein said sweetener comprises from about 1% to about 14% of said beverage.

21. A shelf stable beverage composition according to claim 18 wherein said beverage have a pH of between about 3.0 to about 3.8.

22. A shelf stable beverage composition according to claim 18 wherein said flavorant is fruit juice selected from group consisting of apple, pear, lemon, lime, mandarin, tangerine, grapefruit, cranberry, orange, strawberry, grape, kiwi, pineapple, passion fruit, mango, guava, raspberry and cherry, grapefruit, orange, lemon, lime, mandarin, mango, passion fruit, guava, and mixtures thereof.

23. A shelf stable beverage composition according to claim 17 wherein said sweetener comprises from about 0.01% to about 0.1% artificial sweetener.

24. A shelf stable beverage composition according to claim 23 wherein said sweetener is aspartame.

25. A shelf stable beverage composition according to claim 17 wherein said beverage has a pH between about 2.5 and about 4.0.

26. A shelf stable beverage composition according to claim 17 wherein said citric acid comprises from 0.1% to about 0.5%.

27. A shelf stable beverage composition according to claim 17 further comprising from about 0.013% to about 0.02% caffeine.

28. A shelf stable beverage composition according to claim 17 which is stable from discoloration and flavanol precipitation for at least 2 months at 70° C.

29. A shelf stable beverage composition according to claim 17 further comprising Vitamins A, C, E and mixtures thereof.

* * * * *